United States Patent [19]

Marsh et al.

[11] 4,210,962
[45] Jul. 1, 1980

[54] PROCESSOR FOR DYNAMIC PROGRAMMING

[75] Inventors: James P. Marsh, San Jose; Howard L. Steadman, Santa Cruz, both of Calif.

[73] Assignee: Systems Control, Inc., Palo Alto, Calif.

[21] Appl. No.: 920,970

[22] Filed: Jun. 30, 1978

[51] Int. Cl.² ............................................. G06F 15/46
[52] U.S. Cl. .................................. 364/402; 364/105; 364/300; 364/900
[58] Field of Search ............... 364/105, 200, 300, 402, 364/900

[56] References Cited

U.S. PATENT DOCUMENTS 3,411,140  11/1968  Halina et al. ........................ 364/900
3,974,481  8/1976  Ledieu et al. ..................... 364/402 X

OTHER PUBLICATIONS

R. E. Larson et al., "Parallel Processing Algorithms for the Optimal Control of Non-Linear Dynamic Systems," *IEEE Trans. on Computers*, vol. C-22, No. 8, Aug. 1973, pp. 777-786.

P. A. Gilmore, "Structuring of Parallel Algorithms," *Journal of the Association for Computing Machinery*, vol. 15, No. 2, Apr. 1968, pp. 176-184.

*Primary Examiner*—Jerry Smith
*Attorney, Agent, or Firm*—C. Michael Zimmerman

[57] ABSTRACT

A parallel/pipeline processor is described designed to quite rapidly solve optimization problems with dynamic programming. The state variables and optimum costs associated with a transition are presented simultaneously to a plurality of parallel comparators at the base of a tree of comparators. Such values are presented in a serpentine memory arrangement which sequentially advances the values between the base comparators to enable the comparator tree to compute optimum transitions for successive state space cells in a pipeline fashion.

10 Claims, 8 Drawing Figures

FIG. 1A

| STATE \ STAGE | 1 | 2 | 3 | 4 | 5 | 6 | 7 | 8 |
|---|---|---|---|---|---|---|---|---|
| 5 | 1.5 | 1 | 1 | 1 | 1 | 1 | 1 | 1 |
| 4 | 1.5 | 1.5 | 1 | 1 | 1 | 1 | 1 | 1 |
| 3 | 2 | 2 | 1.5 | 1 | 1.5 | 2 | 2 | 2 |
| 2 | 3 | 3 | 2 | 1 | 2 | 3 | 3 | 3 |
| 1 | 4 | 4 | 3 | 2 | 3 | 4 | 4 | 4 |

FIG. 1B

| STATE \ STAGE | 1 | 2 | 3 | 4 | 5 | 6 | 7 | 8 |
|---|---|---|---|---|---|---|---|---|
| 5 |  |  |  |  |  |  | X | X |
| 4 |  |  |  |  |  |  | X | X |
| 3 |  |  |  |  |  |  | X | X |
| 2 |  |  |  |  |  |  | 8 | X |
| 1 |  |  |  |  |  |  | 9.5 | 4 |

FIG. 1C

| STATE \ STAGE | 1 | 2 | 3 | 4 | 5 | 6 | 7 | 8 |
|---|---|---|---|---|---|---|---|---|
| 5 | 23 | 20 | 17.5 | 15 | X | X | X | X |
| 4 | 24 | 21 | 18 | 15.5 | 13 | X | X | X |
| 3 | 25.5 | 22.5 | 19.5 | 16.5 | 14 | 11 | X | X |
| 2 | 28 | 25 | 21 | 17.5 | 15.5 | 12.5 | 8 | X |
| 1 | 31.5 | 27.5 | 23 | 20 | 18 | 14.5 | 9.5 | 4 |

PROCESSOR FOR DYNAMIC PROGRAMMING

BACKGROUND OF THE INVENTION

The present invention relates to processors and, more particularly, to a processor having a parallel pipeline architecture designed especially to solve dynamic programming problems rapidly.

Dynamic programming provides a sequential decision-making approach for solving optimization problems. For example, the minimum fuel path of an aircraft between two locations often can be determined by using dynamic programming. In basic terms, dynamic programming converts a comparison of the many overall choices to select the optimum choice into a sequential comparison of much simpler intermediate optimization problems. In the aircraft example, the space (typically called a "state space") through which the aircraft can travel is divided into a multiple number of space volumes or cells. The optimum transitions from one cell to each of the adjacent ones closer to the end point is then calculated. The optimum transition may be dependent, for example, on the altitude and velocity of the aircraft.

The candidate optimum transitions of the aircraft from each and every one of the cells within which it can exist in the state space between the starting and end points are compared, and these optimum transitions are utilized to calculate the overall optimum path between the two points. Dynamic programming typically is carried out in reverse, i.e., by starting the calculations at the cell containing the end point and performing the calculations in reverse therefrom.

While the above example is based on the path of an aircraft between two points, dynamic programming is applicable to many other types of optimization problems in which a state space (not necessarily representative of physical space or volume) can be divided into cells. Manufacturing process control problems which can be characterized by a sequential solution of simpler intermediate optimization problems are also subject to dynamic programming solution. More details and specific explanations of dynamic programming can be found in the books entitled *Applied Dynamic Programming* by R. E. Bellman and S. E. Dreyfus, Princeton University Press (1962) and *State Increment Dynamic Programming by R. E. Larson*, American Elsevier Publishing Company, Inc., (1968) New York, N.Y.

While dynamic programming is a powerful tool for solving optimization problems, it has not found any significant usage in real-time applications in which solutions are required or desired relatively rapidly. For example, before the present invention, dynamic programming could not, as a practical matter, be used to determine the optimum path for a moving aircraft in real-time. The difficulty is that conventional digital computers on which such programs are solved are limited to serial solutions. It will be recognized that to solve a dynamic programming problem, it is necessary to serially make numerous computations, each one of which is dependent upon the results obtained in earlier comparisons. In any real-time situation, even with very fast processing speeds, it often takes more than a minute to obtain a solution. Again considering an aircraft, if an optimum path to some location from an aircraft's present position was chosen by a dynamic programming solution using conventional techniques, by the time the solution was obtained, the aircraft would have so materially changed its position the solution would be relatively meaningless.

Although parallel algorithms for dynamic programming problems have been described in the past (see the paper entitled "Parallel Processing Algorithms for the Optimal Control of Non-Linear Dynamic Systems" by R. E. Larson and E. Tse, *I.E.E.E. Transactions on Computers*, Volume C-22, No. 8, August 1973, pages 777-786), sufficiently adequate methods of organizing the data and passing it between computational elements have not been provided prior to the instant invention to permit the design of a parallel dynamic programming device. That is, the intermediate solutions required for optimum transitions from adjacent cells often requires the same information. The resulting necessity for interprocessor communication in any conventional arrangement has added more complexity and time to dynamic programming device designs to warrant their use.

SUMMARY OF THE INVENTION

The present invention provides a processor especially designed to solve dynamic programs in a minimum of time and without the necessity of complex interprocessor communication. It accomplishes this by providing separate computation means to simultaneously make the comparisons necessary to determine the optimum one of the numerous transitions which can be made to or from one cell to any allowable one adjacent thereto. In this connection, it includes a memory arrangement which simultaneously presents to a plurality of computation means, the data associated with various pairs of candidate transitions to or from a cell being investigated. As a particularly salient feature of the instant invention, the computation means are so related to one another, and the memory means is so designed, that computations for the candidate transitions to or from cells which are adjacent to one another can be made simultaneously without contention for data by the different computation means. In a very basic sense, the processor of the invention can be referred to as a parallel/pipeline computer architecture.

The invention includes other features and advantages which will be described or will become apparent from the following more detailed description of a preferred embodiment.

BRIEF SUMMARY OF THE DRAWING

With reference to the accompanying four sheets of drawing:

FIGS. 1(a)–(c) provide a simple example of dynamic programming to facilitate an understanding of the present invention;

DETAILED DESCRIPTION OF A PREFERRED EMBODIMENT

Figure 2:
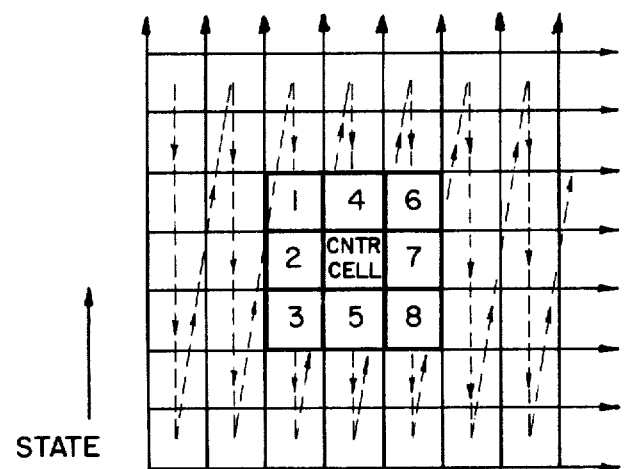
FIG. 2 is a representation of a state space and the manner in which it is scanned by a preferred embodiment of the invention.

For an understanding of the present invention and a true appreciation of the advance in the state of the art it represents, a fundamental understanding of dynamic programming is believed to be necessary. As mentioned previously, dynamic programming is an approach for solving optimization (maximization or minimization) problems, relying on dissecting the main optimization problem into many intermediate optimization problems. In other words, dynamic programming converts the simultaneous determinations of an entire optimization into a plurality of sequential solutions of vastly simpler intermediate optimization problems. The resulting overall solution is precisely the same solution which would be obtained if one exhaustively checked all possible transition combinations, and is obtained without actually performing such a computationally prohibitive search. A dynamic programming problem is characterized by the fact that the decision made at one time affects the decisions made later in the process, and is not just a decision unto its own.

In explicit dynamic programming, the overall problem is divided into "stages" of a "state space". (The term "dimension" or "dimensions" are sometimes used as an alternative to the term "state space". However, neither dynamic programming nor the instant invention is in any way limited to problems in which the state space represents geometric dimensions, and for this reason the term "state space" will be used herein to avoid possible confusion.) The state space is itself divided into a plurality of adjacent "cells". Implicit dynamic programming is essentially the same as explicit dynamic programming, except that the stages of a state space are replaced, in effect, by additional state space variables. The instant invention is described in connection with explicit dynamic programming.

Generally, in a dynamic programming problem the goal is to advance from a state space cell in one stage to a state space cell in another stage until the cell in the stage and state space representative of the final solution is reached. The issue with respect to each transition from one stage to another is into which state space cell of the new stage should the transition be made in order to achieve the optimum transition. It should be noted that while the problem described herein solved by the instant invention requires an advancement from one cell in the state space to an adjacent cell at the next stage, from the conceptual standpoint dynamic programming is not so limited. That is, some problems may permit transition to any cell in the next stage. The instant invention is equally applicable to the solution of such other problems.

The basic features characteristic of most problems suitable for solution by dynamic programming are as follows:

1. the overall problem can be divided into stages, with a policy decision required at each stage;
2. each stage has a number of states (state space cells) associated therewith;
3. the effect of the policy decision at each stage is to transform the current state into a state associated with the next stage (possibly according to a probability distribution);
4. given the current state, the optimum policy decisions for the remaining stages is independent of the policy adopted in previous stages;
5. the solution procedure begins by finding the optimum policy for each state at either the beginning or last stage;
6. a recursive relationship is available which identifies the optimum policy for each state space with a specified number of stages remaining, given the optimum policy for each state with the specified number of stages remaining, less one; and
7. using this recursive relationship, the solution procedure moves from stage to stage until the optimum overall decision is made.

The equations of any dynamic system undergoing dynamic programming can be linear or non-linear and time-varying. The criteria on which the optimization is based can be quite arbitrary. Constraints of a wide variety are permitted. Random effects of a very general nature can be rigorously taken into account, by using the same analytic formulation. In addition, the variables representing a state space are almost always chosen to provide an absolute optimum in each state space, rather than a local optimum. Moreover, most dynamic program solutions specify the optimum transition at each state of the system for every stage; thus, a dynamic programming solution can be implemented as a feedback (closed-loop) controller, in which the state of the system is constantly measured and the corresponding optimum control is applied.

FIGS. 1(a) through 1(c) are included to illustrate graphically dynamic programming applied to a simple, one-state optimization problem. Let it be assumed that we are interested in knowing the flight path of an aircraft to a specified landing field location which will use the minimum amount of fuel. The aircraft of concern is capable of changing altitude but is incapable of turning either left or right, i.e., the aircraft will start out and stay in a single geometric plane containing the starting location and the landing field. Let it further be assumed that the "state space" in which the aircraft is to end its flight is known, but there are a plurality of different airfields or "cells" from which the aircraft could start. Thus, "reverse" dynamic programming is a more suitable tool for solving the optimization problem, than "forward" dynamic programming.

The grid pattern illustrated in FIGS. 1(a) through 1(c) represents a typical state space for such an aircraft problem. As illustrated, there are eight stages, each one of which is made up of five state cells. In this particular problem, the stages correspond to intervals along the ground track, and the states correspond to the altitude of the aircraft. The "cost" of flying in any particular state space cell is proportional to the amount of fuel needed to fly at the altitude represented thereby. The numbers inserted in each of the state space cells of FIG. 1(a) represents such cost.

Transitions of the aircraft are limited to movement thereof from the cell in the stage in which it finds itself to a cell of the succeeding stage adjacent to the cell within which it is in. As will be recognized, this will require the aircraft to either gain altitude diagonally, remain at the same altitude, or lose altitude diagonally. Thus, there is also a cost in fuel required for the transition itself. Let us assume that each of these transition costs can be represented by the unit 1 for a loss of altitude, the unit 1.5 for staying at the same altitude, and the unit 2.5 for a gain of altitude. The total cost for a transition to a new cell in an adjacent stage is the sum of the cost of flying in such cell and the cost of making the transition thereto. This total cost will be identified herein by the letter "S".

While the total cost in this particular problem includes an actual physical transition of the aircraft from one state space cell to another, the term "transition" as used herein is meant not only to encompass data associated with such an actual transition but also data defining one or more other variables associated with a state space cell being checked.

Let it be assumed that the landing field is in the first state cell of the last stage, i.e., stage 8. Thus only state 1 in such stage is "allowable". And, the only states in stage 7 which are allowable are those two states adjacent to state 1 in stage 8, i.e., states 1 and 2 of stage 7.

The first step is to calculate for each of the allowable states (or cells) at stage 7, the cost of a transition to state 1 of stage 8. FIG. 1(b) provides the results. The numerals in the first two cells of stage 7 indicate the total cost in fuel associated with a transition through such states and a transition to the end, stage 8, state 1. The arrows represent the optimum transition paths. Since there is only one allowable path from each of the two states in stage 7 to the end state in stage 8, the arrows in this particular situation represent the only path. The numerals "8" and "9.5" in the two states 1 and 2 (stage 7) represent, respectively, the total overall cost associated with the transition from the cells within which they are found, to the last stage. Notice that this overall cost to the last state in the last stage has replaced the cost set forth in FIG. 1(a) associated with each cell. This overall cost to the end is referred to herein as "Q".

Continue calculation for each stage in the reverse direction, at each stage calculating, for every allowable state, the best state in which to go in the succeeding stage. Note that this single stage optimization is "globally optimum" in the sense that the best path and total cost for each state from the next stage to the end has already been calculated.

FIG. 1(c) presents the total cost to the end ("Q") for all allowable states at all stages. Note that there are transition ties, i.e., transitions from one stage to the next succeeding state can be optimally made to more than one state space cell. Such transitions are indicated by more than one arrow extending from a cell in one stage into cells of the next succeeding stage. In actual practice, round-off errors will typically cause two equal paths to be slightly different, resolving such potential conflicts.

The overall optimum path is indicated by the minimum total cost set forth in a cell of stage 1. This minimum is "23" in state 5 of stage 1, and the optimum path is indicated by the arrows extending from such state to state 1 of stage 8.

It should be noted that although in the above example the various costs were added to arrive at an actual cost, and thus the "cost function" is the sum of the cost at each stage, in some problems, the cost function may be the product of the costs at each stage. Such calculations are often simplified in dynamic programming by employing as costs the logarithms of the actual values involved, so that addition can be substituted for the multiplication. There are, however, other functions on the cost besides addition and multiplication, which could be optimized, and the instant invention is not function limited.

Whereas the above simple example of dynamic programming is based on a one-state (or one dimension) problem, most practical problems require dynamic programming of a plurality of state dimensions. The preferred embodiment of the invention will be described with an architecture for solving a two-state problem involving aircraft flight. However, it will be recognized by those skilled in the art that the principles on which the architecture is based are applicable to solving optimization problems with dynamic programming utilizing any number of states. The architecture need only be expanded to handle additional states, or retracted to handle a single state.

FIG. 2 graphically illustrates a two-state aircraft optimization problem and how the architecture of the instant invention is related thereto. This two-state problem is like the aircraft problem used earlier, except that the aircraft can fly either to the left or right, i.e., state space cells in adjacent planes are allowable. In this connection, note that the stage axis extends perpendicular to the page of the drawing, whereas the two state axes are respectively horizontal and vertical lines in such plane. The sequential stages can be thought of as sequential planes parallel to the plane containing the sheet of the drawing, with succeeding stages in the direction of aircraft travel being successively farther away from the viewer. To determine the optimum transition from any specified state space cell at a given stage to the next stage using reverse dynamic programming, transitions to all adjacent cells in the next stage (in front of the drawing sheet) must be checked. This is with the assumption that the problem is one in which only transitions to adjacent cells are allowed.

Turning to FIG. 2, it is a checking of the cells surrounding the center state space cell that will be used to describe the instant invention. Only transitions from the center cell to such cells in the stage illustrated, referred to by the numerals 1 through 8, will be allowed. Transitions from the center cell of the stage illustrated to the center cell being checked of the next succeeding stage are considered trivial and are not allowed in the problem for which the preferred embodiment of the invention was designed.

Each of the allowable state space cells in the illustrated stage has at least two variables associated therewith, a "Q" variable representing the optimum transition to the end of the problem and an "S" variable representing the cost associated with the state space cell itself. It is to be remembered that such cost variable "S" may itself be a function of a plurality of cost variables, such as the cost of moving into the state and the cost of moving through the same, as in the example described previously.

Figure 3:
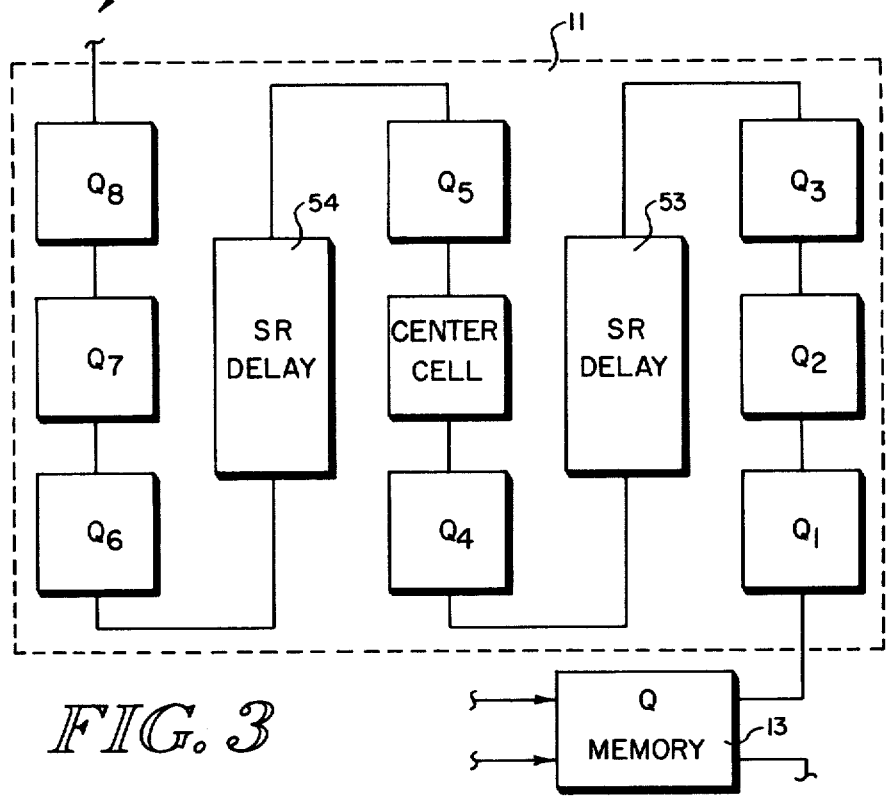
FIGS. 3 and 4 are block diagrams illustrating a memory arrangement for presenting data to the computation architecture of FIG. 5.
Figure 4:
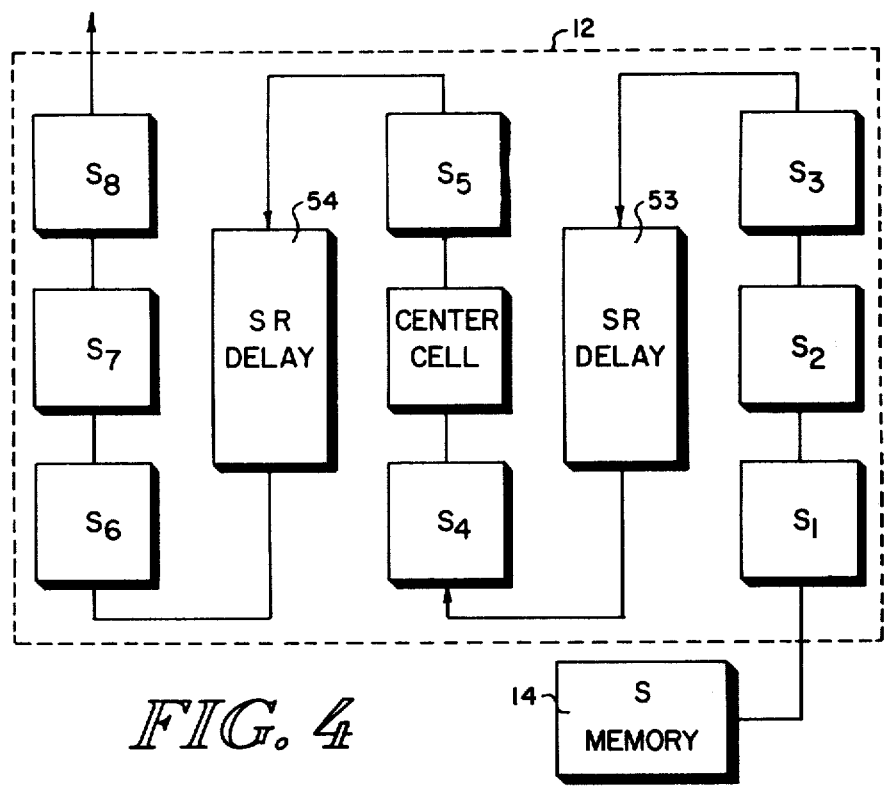

The present invention enables the transitions from the center cell in the stage illustrated, to the surrounding cells being checked in the next stage, to be determined simultaneously. To this end, the invention includes means to present simultaneously data associated with transitions from the state cell being checked to each of the allowable state cells illustrated in FIG. 2. That is, the serpentine memories 11 and 12 as represented in FIGS. 3 and 4 by the dotted line boxes present respectively the "Q" and "S" values for the allowable state space cells in a serial fashion. These values are obtained from main "Q" and "S" memories 13 and 14, respectively, which memories retain all of the calculated Q's and given S's. Although these memories are represented in the drawing by two separate blocks, it will be recognized that most probably they would be provided as separate space allocations in a single memory.

Each serial memory word location in the serpentine memories of FIGS. 3 and 4 is tied to the two-state representation of FIG. 2. For example, the box labeled "$Q_8$" in the serpentine memory of FIG. 3 represents the location of the Q value for the state space indicated by "8" in FIG. 2. Similarly, the location in serpentine memory 12 of the word representing the "S" value for state space 8 in FIG. 2 is represented by the box "$S_8$" in FIG. 4. The other word locations in the two memories are likewise labeled. Each of the serpentine memories 11 and 12 also include shift registers at appropriate locations as will be discussed, to separate the data flowing through the serpentine memories in connection with a particularly salient feature of the instant invention to be described.

Figure 5:
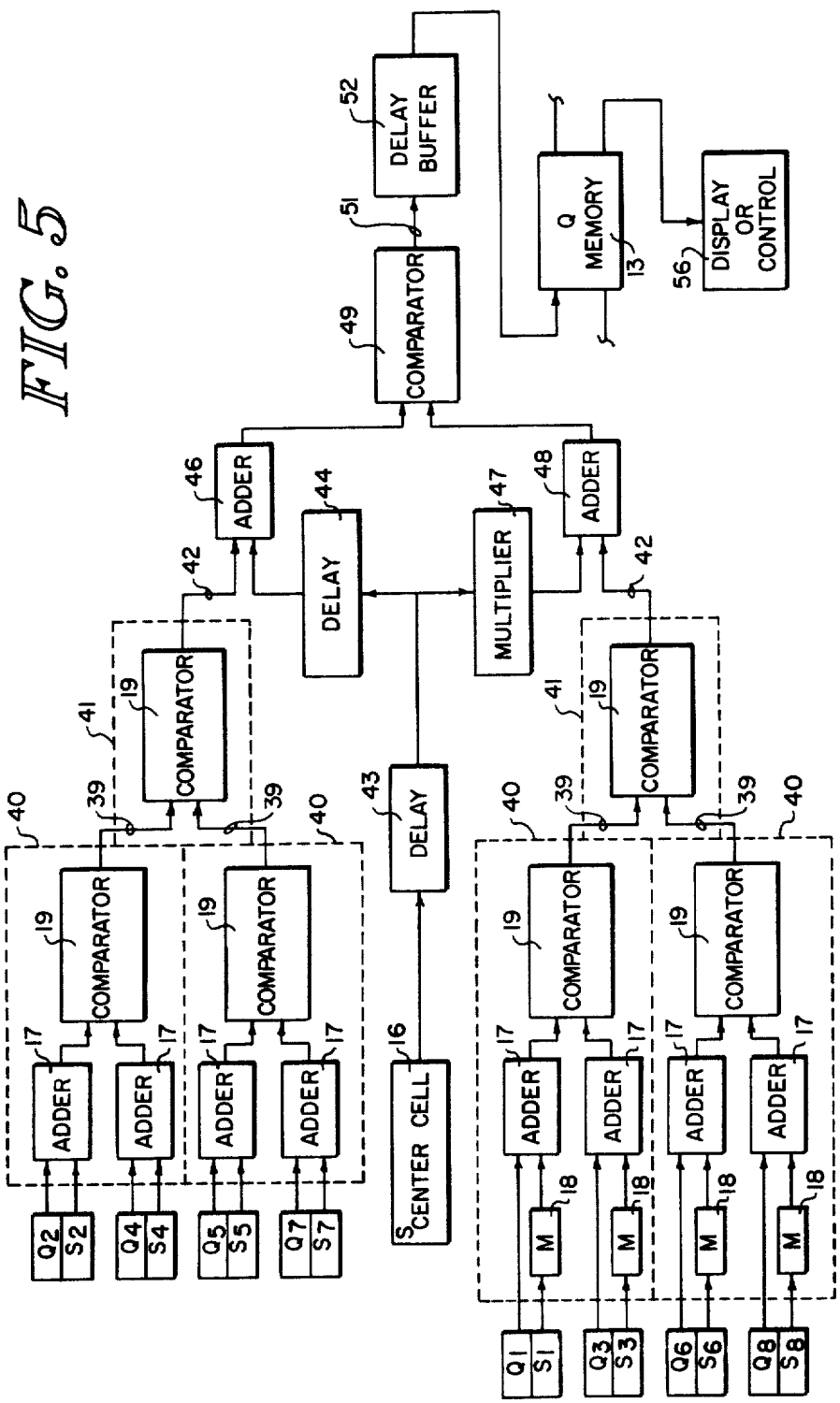
FIG. 5 is a block diagram of a preferred embodiment of the computer architecture of the invention, designed to solve a two-state, aircraft path dynamic program.

FIG. 5 schematically illustrates the computational architecture of the present invention. The word locations in the serpentine memories for each of the "Q" and "S" values associated with the allowable state spaces surrounding the cell being checked is represented at the left in the figure. It will be noted that all of the word locations illustrated above the box 16 labeled "center cell" are of cells from which diagonal transitions to the state space cell being checked are required, whereas all of the word locations represented below the box 16 are those for cells requiring horizontal or vertical transitions to the cell being checked. The purpose for this segregation will be described hereinafter.

The "Q" and "S" values of each allowable state space cell adjacent the state space cell being checked are combined to provide a total optimum for such cell. This addition is represented in FIG. 5 by adder blocks 17.

In the particular dynamic problem for which this preferred embodiment was designed, the time required to traverse each state space cell diagonally is greater than the time required to traverse each cell horizontally or vertically; thus there is a corresponding additional fuel cost associated with a diagonal transition. Such additional cost must be taken into account in computing the optimum transition. It is taken into account, insofar as the cells of the stage illustrated in FIG. 2 is concerned, by multiplying the logarithm of the "S" value of each of the state space cells which would require a diagonal transition from the cell being checked, by the ratio of the diagonal transit time to the direct transit time. This multiplication is represented in FIG. 5 by the blocks 18 positioned between the outputs of each of the serpentine memory locations representing diagonal transitions, and its associated adder 17.

Figure 6:
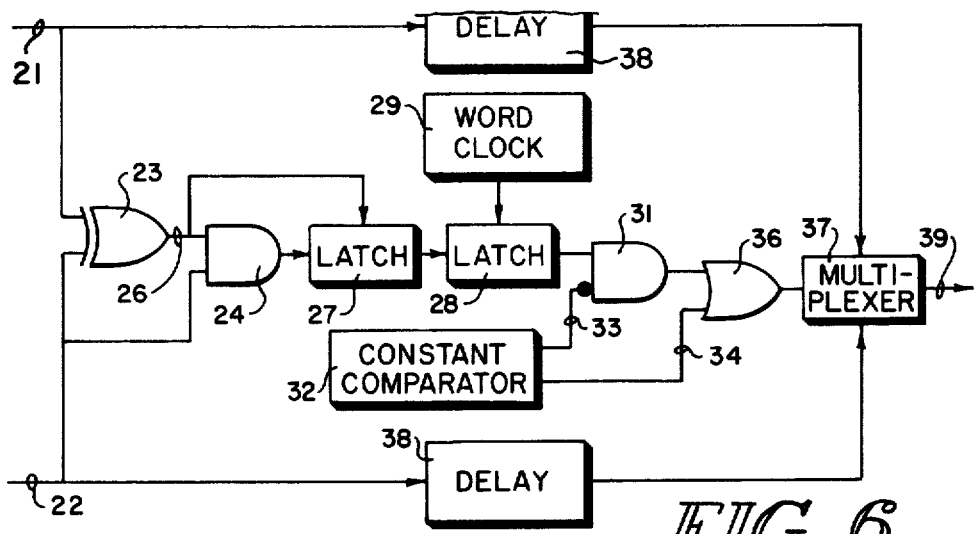
FIG. 6 is a schematic logic diagram illustrating in more detail the design of a comparator circuit for the initial comparison of a pair of transitions from a cell in a state space.

The respective outputs of each pair of adders 17 is compared to determine which of the two transitions represented thereby is the optimum one. In this connection, such outputs are connected to the inputs of an associated comparator 19. The compare decisions made at this time should take into account whether or not the state cell being checked is at an edge of the state space, and whether or not each of the adjacent cells of the next stage are allowable. FIG. 6 illustrates suitable comparator circuitry for each of the comparators 19. The words of data emanating from the associated adders 17 respectively appear on the lines 21 and 22. Each of such words are made up of a plurality of bits defining not only the absolute value of the combined term, but also the optimum transition direction for the "Q" value of the cell represented thereby. The bits defining these words are presented serially on the lines 21 and 22, and an exclusive OR gate 23 samples corresponding bits on the lines 21 and 22 defining the absolute values of the combined terms. The logic made up of exclusive OR gate 23 and AND gate 24 will indicate any discrepancy between such bits. That is, the output of the exclusive OR gate 23 appearing on line 26 will have one voltage state when the bits are the same, and another state when such bits are different. This output is compared by AND gate 24 to the bit appearing on line 22, for example, to determine which line should be selected. If there is a discrepancy, the output of AND gate 24 will be stored in a latch 27, which latch is strobed by the output of the exclusive OR gate 23.

It is the last bit discrepancy which indicates finally which of the words appearing on lines 21 and 22 is to be selected. This is because the last bit of each word is the most significant bit. The state indicated by latch 27 is fed to and stored within a latch 28, upon a word clock 29 indicating that the ends of the words appearing, respectively, on lines 21 and 22 have been reached.

"Override" structure is included in the comparator 19 to assure that improper optimums are not obtained either because a transition to one of the cells is not allowable in the problem or because the cell being checked is adjacent an edge of the state space. More particularly, the state of latch 28 is fed to one input of an AND gate 31. The other input of the AND gate 31 is controlled by a memory index for the cell being checked. This is represented in the drawing by constant comparator box 32. This box will place an output on either of its two output lines 33 and 34 depending upon whether or not the cell being checked is at an edge space. Its output on line 33 will normally allow the state stored in latch 28 to be passed through the AND gate 31 to an OR gate 36. However, when the cell being checked is adjacent to an edge of the cell space, or one of the cells represented by the words on line 21 and 22 is not allowable, the logic formed by the combination of the AND gate 31 and the OR gate 36 will force the comparator to choose only the allowable cell state. In this connection, the output of gate 36 is fed to the control input of a multiplexer 37. The words appearing serially on the lines 21 and 22 are fed, through delays 38 designed to take into account the time delay involved in the selection process, to opposite data input terminals of the multiplexer 37. The word representing the optimum will be the only word which will be passed by the multiplexer 37 to its output as represented at 39 (FIGS. 5 and 6).

It will be recognized from the above that each pair of adders 17 (and their attendant multipliers where applicable) along with their associated comparator 19, acts, in effect, as computation means to compare data representative of transitions to or from each one of a pair of states to determine the optimum one of such pair. Such computation means are enclosed individually in dotted line boxes indicated by the reference numeral 40.

It should be noted that while in this embodiment the data which defines the direction associated with the Q value of each cell accompanies the absolute value of the Q through the various computations, it can instead, if desired, be generated by the various computations required to select the optimum transition.

The output of each pair of computations means 40 is fed to further computation means enclosed by the dotted line box 41. Each computation means 41 includes a comparator 19 (the same as the earlier described comparators 19), and selects which of the transitions represented by its two inputs is the optimum one, and passes the data representing the same to its output on line 42.

It will be noted that the outputs on the two lines 42 will represent the respective direct and diagonal optimum transitions. As mentioned previously, there is an additional transition cost associated with a diagonal transition. While this additional cost was taken into account insofar as the stage from which a transition to the cell being checked is to occur, the additional cost for traversing the cell being checked has not yet been taken into account. It will be noted, though, that this additional cost will be the same for all of the diagonal transactions and need not be taken into account until just before the optimum diagonal transition is compared with the optimum direct transition. To this end, the preferred embodiment being described includes means to adjust the value of such optimum transitions. More particularly, the "S" value of the cell being checked, the center cell 16, is added or multiplied by a constant and then added, as appropriate, to the direct and diagonal optimum transitions prior to the same being compared. The result is delayed, of course, as represented by the blocks 43 and 44, to assure that the value will reach the adder 46 which combines the terms, at the same time as the output of the comparator 41 which ultimately selected the optimum direct transition.

The constant which is multiplied by the "S" value of the center cell is the ratio of the diagonal transit time to the direct transit time. This multiplication is represented in FIG. 5 by multiplier 47 positioned between delay 43 and the adder 48.

The optimum direct and the optimum diagonal transitions are compared to one another for selection of the overall optimum transition. This is represented by the output of the adders 46 and 48 being fed to comparator 49. Comparator 49 can include the same logic as the comparators 19. The overall optimum transition will then appear on the output line 51 of comparator 49. This overall optimum transition will be in the form of a new "Q" value for the cell being checked, as well as data representing the direction of the transition to the cell which must be taken to achieve the optimum transition, i.e., the data will also indicate from which cell in the stage illustrated in FIG. 2 the transition must be made in order to achieve the optimum "Q" value which is so represented.

It should be noted that there may be other constant factors which need not pass through the full comparator tree prior to being taken into account. For example, it may be in an aircraft problem that several different aircraft speeds could be used in making transitions. The optimum transition could be selected neglecting the speed factor, and then the speed factor taken into account to select the ultimate optimum transition.

The data defining the optimum transition for the cell being checked will be fed into the Q memory 13 to replace the earlier Q value for the cell. This rewriting of the data in the Q memory, though, has to be delayed until such time as the old Q value for the cell is no longer needed in the checking of those cells adjacent the center cell being checked. This delay is provided by a delay buffer 52.

It will be appreciated by the above that the invention provides parallel processing in the sense that all of the transitions for the cell being checked are compared simultaneously. That is, all of the computation means 40 operate simultaneously on data supplied thereto via the serpentine memories. This data defines the transitions from the cell being checked to all of the cells of the next stage.

As a particularly salient feature of the instant invention, it not only provides parallel processing for the center cell being checked, but enables those cells adjacent to such center cell to also be checked contemporaneously therewith. In this connection, it will be noted that while all of the computation means 40 will provide their computations simultaneously, once they have completed their comparison cycles such computation means are no longer required to determine the optimum transition for the cell being checked. It is therefore comprehended within the instant invention that simultaneously with the comparisons by the computation means 41 of the results provided by the associated computation means 40, the computation means 40 are used to compare transitions in the determination of the optimum transition for another cell. This simultaneous usage of the successive computation means for the determination of the optimum transitions. to adjacent cells is continued for the full length of the computation "tree".

The contemporaneous checking for the optimum transitions to a plurality of cells is made quite simple and efficient by the combination of the serpentine memories with the computation architecture discussed above. In this connection, reference is made to FIG. 2 which illustrates the manner in which the cells whose transitions to the state space illustrated preferably are successively checked, i.e., the manner in which the state space is scanned. This scanning is represented in the figure by the dotted line arrows and, as can be seen, is similar to raster scanning in the sense that such scanning occurs column by column with retrace lines between such columns. Each of the serpentine memories is arranged to coincide with such scanning. That is, as can be seen by referring to FIGS. 3 and 4, the order of the address locations for the Q and S values coincides with the order in which the cells adjacent to the cell being checked are encountered during the scanning. Thus, the Q and S values for the cells labeled "1", "2" and "3" are at the ends of the respective serpentine memories. Each of the memories further includes a shift register delay 53 positioned between the address locations for the respective cells labeled "3" and labeled "4". For the particular state space illustrated in FIG. 2, the shift register delay should be four cells long and contain the respective Q and S values for the four cells of the state space which are scanned between the time the cells labeled "3" and "4" are encountered. The address locations for the Q and the S values of the center cell are positioned in the serpentine memories between the locations for the corresponding values of the cells labeled "4" and "5". It should be noted that only the S value of the center cell is required in connection with the optimization computations, and it is only such value which is tapped by the computation arrangement illustrated in FIG. 5.

Another shift register delay 54 is disposed between the address locations in the respective serpentine memories for the Q and S values for the cells labeled "5" and "6". The purpose of such shift register is the same as that of the shift register 53, i.e., to provide the appropriate scanning space between the cells labeled "5" and "6".

The serpentine memories are strobed to sequentially advance the value of each of the locations into the next location upon completion of each comparison cycle. The result is that the apparatus is automatically adjusted to begin checking for the optimum transitions to the cell immediately adjacent (in the case of FIG. 2, immediately below) the cell undergoing checking. Thus, as soon as the computation means 40 are finished with their comparisons, they are automatically readied to accept values to be compared for the next cell to be checked. It will therefore be seen that the combination of the serial serpentine memories with the computation architecture described provides in a simple manner an arrangement for not only providing the initial comparisons in parallel via the computation means 40, but also determining the optimum transition of adjacent cells in a pipeline fashion. An optimum transition for a cell will emanate from the comparator 49 at each word clock and be fed to the delay buffer 52. The optimum transitions are returned to the Q memory 13 as previously mentioned, for storing for later use. This later use, which typically takes the form of a display or control, is represented in FIG. 5 by box 56.

It will be seen from the above that since the processor of the invention is a parallel/pipeline device, it is capable of solving dynamic programming problems much more rapidly than serial computers. Because of such capability, the processor is usable to control in near real-time, processes and other functions which can be optimized using dynamic programming. It is also usable to solve certain types of detection and tracking problems in near real-time which heretofore have been incapable of solution by dynamic programming. Depending upon the particular problem to be solved, solutions can be obtained with the instant invention as much as one hundred times as fast as one can be obtained using conventional serial computation techniques. And as the dynamic programming problem becomes more complex, i.e., includes more and more state variables, the speed-up become even more dramatic.

While the invention has been described in connection with a preferred embodiment, it will be appreciated by those skilled in the art that various changes and modifications can be made. In this connection, the preferred embodiment has been described and designed especially for a two-state variable problem. It will be recognized, however, that it is easily within the skill of the art to expand the architecture to accommodate problems having more than two state variables. Moreover, the various computation means could be in the form of programmable microprocessors or the like, especially in a general purpose parallel/pipeline processor. And while the preferred embodiment has been described in connection with explicit dynamic programming, the invention is equally applicable to solving implicit dynamic programming problems. In view of these changes and modifications, it is intended that the coverage afforded applicants be limited only by the claims and their equivalent language.

We claim:

1. In a processor for solving dynamic programming problems, the combination comprising:
   A. first computation means to compare data representative of candidate transitions to or from each one of a first plurality of states of a stage of a dynamic programming problem, to determine the optimum one of said first plurality of state transitions;
   B. second computation means to compare data representative of candidate transitions to or from each one of a second plurality of states of said stage of dynamic programming problem, to determine the optimum one of said second plurality of state transitions; and
   C. third computation means to compare data representative of the optimum ones of said state transitions of said first and second pluralities, simultaneously with comparison by said first and second computation means of data respectively representative of transitions to or from states of third and fourth pluralities of states of a successive stage of said dynamic programming problem to determine the optimum one of said state transitions of said third and fourth pluralities.

2. A processor according to claim 1 wherein said data representative of transitions to or from each state is based on a plurality of variables, one of which is representative of transitions to or from at least one other state.

3. A processor according to claim 2 wherein each of said variables representative of a candidate transition to or from another state is representative of a candidate future transition to another state.

4. A processor according to claim 2 wherein said data representative of transitions to or from each of said states of said first and second pluralities of states is representative of a plurality of different variables associated with transitions to each of said states, with the data representative of each of said variables being the value of the logarithm of the actual variable value; and said first and second computation means each further includes an adder for combining logarithmic values of the variables associated with each transition prior to comparison of the same with similar data associated with a transition to or from another state.

5. A processor according to claim 1 further including means to present simultaneously to said first and second computation means said data respectively associated with said transitions to or from said first and second pluralities of states for simultaneous determination of said optimum transitions of said first and second pluralities.

6. A processor according to claim 5 wherein said means to present said data simultaneously to said first and second computation means comprises a serial memory storing said data in a serial fashion adapted to present simultaneously to said first and second computation means, data stored at a plurality of serially related locations therein.

7. A processor according to claim 6 wherein said serial memory is adapted to sequentially advance said data between said serially related locations as said first, second and third computation means makes said comparisons, whereby data representative of different transitions is presented for comparison to said first and second computation means upon completion by said first and second computation means of a comparison cycle on data representative of transitions to or from each of said first and second pluralities of states.

8. A processor according to claim 7 further including means to adjust the value of said optimum transitions determined by said third computation means.

9. A processor according to claim 7 further including:
   A. fourth computation means to compare data representative of candidate transitions to or from each one of a fifth plurality of states provided by said stage of said dynamic programming problem to determine the optimum one of said fifth plurality of state transitions;
   B. fifth computation means to compare data representative of candidate transitions to or from each one of a sixth plurality of states provided by said stage of said dynamic programming problem, to determine the optimum one of said sixth plurality of state transitions;

C. sixth computation means to compare data representative of the optimum ones of said state transitions of said fifth and sixth pluralities, simultaneously with comparison by said fourth and fifth computation means of data respectively representative of candidate transitions to or from seventh and eighth pluralities of states provided by said successive stage of said dynamic programming problem, to determine the optimum one of said state transitions of said seventh and eighth pluralities; and D. means to adjust the values of said optimum transitions determined by said third and sixth computation means by one or more factors representative of variables which are constant for all of the transitions computed to arrive at the respective optimum transitions provided by said third and sixth computation means.

10. In a processor for solving dynamic programs, the combination comprising:

A. first computation means to compare data representative of candidate transitions to or from each one of a first plurality of states provided by a dynamic programming problem, to determine the optimum one of said first plurality of state transitions;

B. second computation means to compare data representative of candidate transitions to or from each one of a second plurality of states provided by said dynamic programming problem, to determine the optimum one of said second plurality of state transitions; and C. a serial memory to store and present simultaneously to said first and second computation means from serially related locations, said data respectively associated with said transitions to or from said first and second pluralities of states, for simultaneous determination of said optimum transitions of said first and second pluralities; which serial memory is adapted to sequentially advance data between said serially related locations as said first and second computation means makes said comparisons, whereby data representative of different transitions is presented for comparison to said first and second computation means upon completion by said first and second computation means of a comparison cycle on data representative of candidate transitions to or from each of said first and second pluralities of states.

* * * * *